Dec. 30, 1969  W. SCHWEER ET AL  3,486,403
MACHINE FOR SHAVING WORKPIECES OF CIRCULAR CROSS SECTION
Filed Sept. 28, 1967  5 Sheets-Sheet 5

INVENTORS:
Wilhelm Schweer
Erich Kracht
Horst Lorenz
By Michael S. Striker
Attorney //
United States Patent Office 3,486,403
Patented Dec. 30, 1969

3,486,403
MACHINE FOR SHAVING WORKPIECES OF
CIRCULAR CROSS SECTION
Wilhelm Schweer, Dorfanger, Erich Krafft, Mettmann,
and Horst Lorenz, Solingen, Germany, assignors to Th.
Kieserling & Albrecht, Solingen, Germany
Filed Sept. 28, 1967, Ser. No. 671,344
Claims priority, application Germany, Oct. 5, 1966,
K 60,393
Int. Cl. B23b 5/00, 3/36
U.S. Cl. 82—20                                9 Claims

ABSTRACT OF THE DISCLOSURE

A machine for shaving metallic pipes, rods or like workpieces of circular cross section. It comprises a rotary shaving head carrying tools which are movable toward and away from the axis of the shaving head and are provided with cutting edges which remove material from the exterior of a workpiece which is fed lengthwise through the rotating head. A wear-compensating structure is provided to adjust the tools in automatic response to increasing diameter of the shaved portion of the workpiece to account for wear on the cutting edges. This wear-compensating structure comprises a pair of feelers which measure the diameters of successive increments of the shaved portion, a signal generating device which is connected with one of the feelers, and a motor which effects adjustments of tools in response to signals from the signal generating device. The motor adjusts the tools through the intermediary of a sleeve having a conical face which engages with complementary faces of the tools or their slides and is shiftable axially of the head through a worm drive which is connected with the output shaft of the motor. The latter is automatically arrested in response to a predetermined adjustment of tools, preferably by means of a limit switch which is opened by a cam driven by the motor.

The two feelers are biased against the workpiece at two diametrically opposite points of the axis of the shaved portion and one thereof can displace the input member of the signal generator which may include an inductance having a movable core.

BACKGROUND OF THE INVENTION

The present invention relates to machine tools in general, and more particularly to improvements in devices which compensate for wear on tools in so-called shaving machines for pipes, rods or like elongated metallic workpieces of circular cross section. Still more particularly, the invention relates to improvements in shaving machines of the type wherein a pipe or rod is fed axially but is held against rotation and wherein a shaving head rotates around the workpiece and carries one or more tools which remove shavings from successive increments of the workpiece.

It is already known to provide a shaving machine for pipes or rods with a manually operated adjusting device which can change the position of knives or tools on the revolving shaving head while the machine is in use to thereby compensate for wear on the cutting edges of tools. The operator must measure the diameter of the shaved portion of the workpiece and thereupon adjusts the tools with reference to the shaving head to compensate for wear thereon to the extent determined by the difference between the desired diameter and the measured diameter of the shaved portion of the workpiece. Such adjustments are not entirely satisfactory because the wear on cutting edges of tools depends on many factors, particularly on the quality of material of the workpiece and, therefore, measurements of the shaved portion of a workpiece must be carried out at intervals which are shorter if the material of a workpiece is very hard and longer if the material of the workpiece is relatively soft. Of course, much depends also on the quality of shaving tools, on the rate of feed of the workpiece, and on the skill and carefulness of operators. In order to be on the safe side, a careful operator must determine the diameter of the shaved workpiece at very frequent intervals so that he will immediately detect such deviation from desired diameter which warrant an adjustment of the material removing tools. Therefore, the operator in charge of determining the diameter of the workpiece is hardly in a position to perform any other work.

SUMMARY OF THE INVENTION

It is an object of our invention to provide a shaving machine for pipes, rods or like workpieces with a device which is capable of automatically adjusting the shaving tools to compensate for wear on their cutting edges.

Another object of the invention is to provide a shaving machine of the just outlined character wherein the wear-compensating device occupies little room and requires a minimum of supervision so that the personnel in charge can perform other tasks because the tools are adjusted in a fully automatic way.

A further object of the invention is to provide an automatic wear-compensating device which can be installed in many types of presently known shaving machines.

An additional object of the invention is to provide the wear-compensating device with a novel system of sensing means.

A concomitant object of the invention is to provide a wear-compensating device which can be used in connection with workpieces of different quality, length and/ or diameter.

Still another object of our invention is to provide a wear-compensating device whose operation can be observed continuously and which consumes small amounts of energy.

A further object of the invention is to provide a wear-compensating device which is provided with an overriding control to allow for manual adjustment of tools independently of the wear on tools.

Briefly outlined, our invention is embodied in a machine for shaving workpieces of circular cross section, particularly for shaving the exterior of tubes, pipes and/ or rods consisting of metallic material. The machine comprises a feed for advancing a workpiece lengthwise, a rotary holder or shaving head surrounding the workpiece, at least one tool carried by and adjustable toward and away fom the axis of the holder, a cutting edge provided on the tool to remove material from successive increments of the workpiece when the holder rotates and the workpiece is fed lengthwise whereby the diameter of the shaved portion of the workpiece increases in response to progressing wear on the cutting edge, and compensating means for adjusting the tool toward the axis of the holder to account for wear on the cutting edge. The compensating means comprises sensing means located downstream of the tool for continuously determining the diameters of successive increments of the shaved portion of the workpiece, signal generating means associated with the sensing means and operative to produce signals indicating changes in the diameter of the shaved portion of the workpiece, and motion transmtting means for adjusting the tool in response to such signals.

The sensing means preferably comprises two sensing members or feelers which engage the shaved portion of the workpiece at two diametrically opposed points and one of which transmits motion to the input member of a suitable signal generator, preferably an inductance which can produce electrical signals indicating the extent of displacement of the one feeler. The signals are used to start an electric motor of the motion transmitting means which adjusts the tool through the intermediary of a suitable transmission, for example, a worm drive which can move a sleeve having an inclined cam face cooperating with a complementary cam face on the tool or on a slide for the tool.

The novel features which are considered as characteristic of the invention are set forth in particular in the appended claims. The improved shaving machine itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
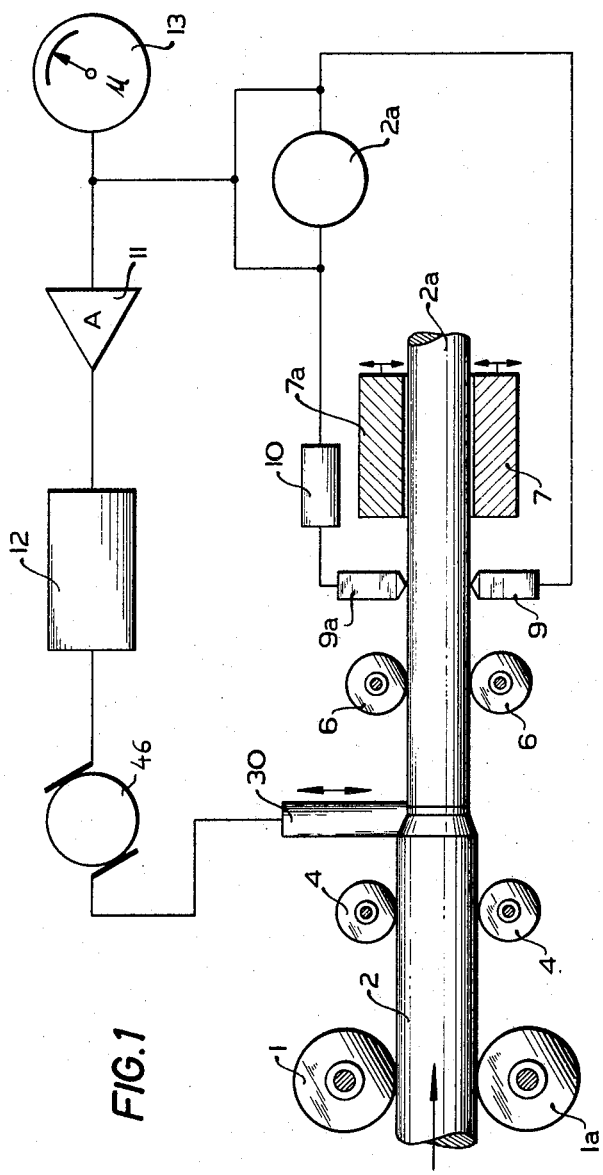
FIG. 1 is a diagram of a shaving machine for pipes or rods which embodies our invention, the shaved portion of the workpiece being shown twice.
Figure 2:
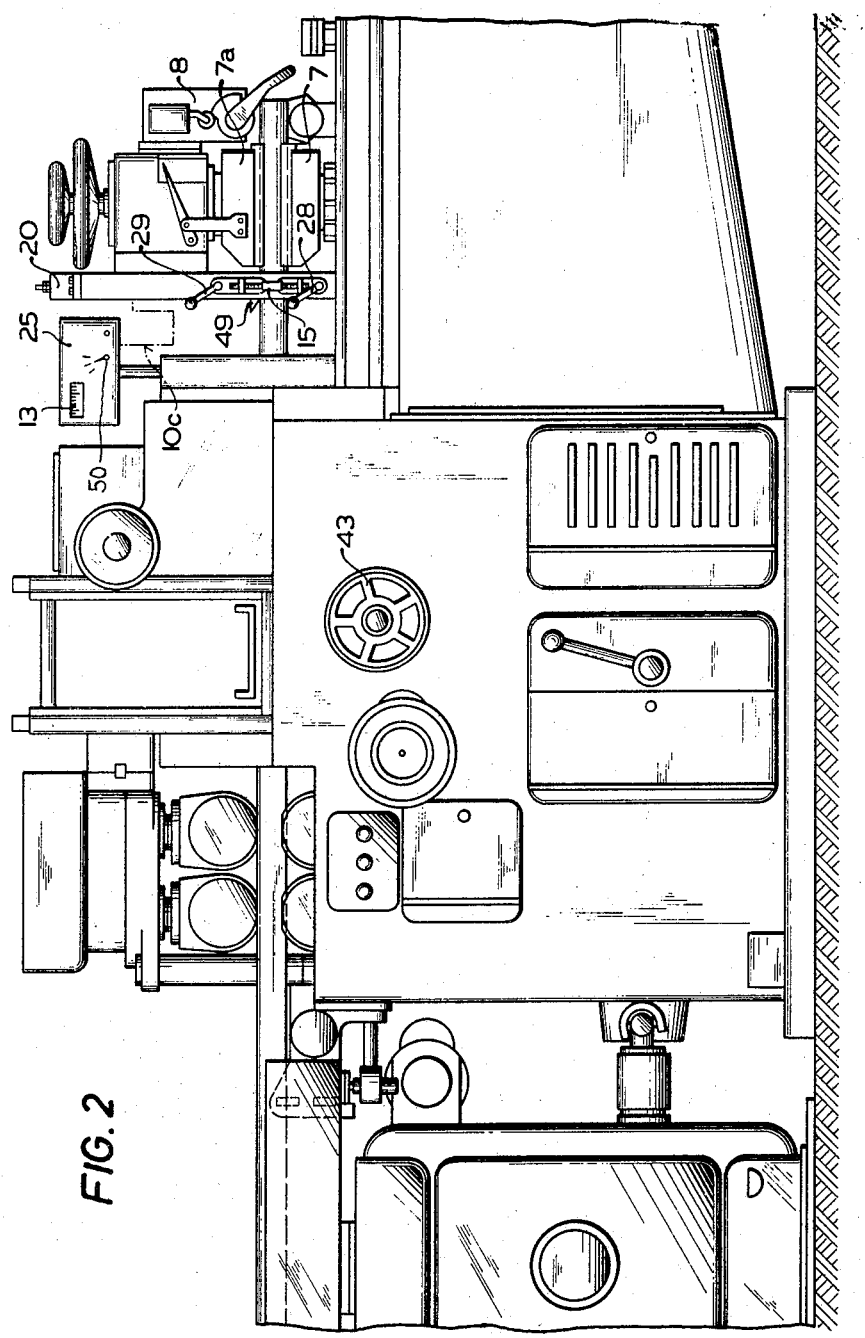
FIG. 2 is a side elevaitonal view of the shaving machine.

Referring first to FIG. 1, there are illustrated certain details of a shaving machine which embodies our invention. The shaving machine comprises a feed including a pair of advancing rollers 1, 1a which feed an elongated workpiece 2 lengthwise and hold it against rotation. The workpiece is a solid rod but the machine is just as suited for shaving of pipes or tubes. The shaving station accommodates a rotary tool holder or shaving head 3 which is shown in detail in FIG. 3. This shaving head supports one or more substantially radially adjustable knives or tools 30. Supporting rolls 4 and 6 are respectively provided ahead of and downstream of the shaving station. The rolls 6 are disposed in the interior of a hollow cylinder 5 forming part of the means for rotating the shaving head 3. The shaved or reduced portion 2a of the workpiece 2 can be engaged by the jaws or claws 7, 7a which are mounted on a reciprocable carriage 8 shown in FIG. 2. The upper jaw 7a is adjustable with reference to the carriage 8 and the lower jaw 7 can be biased against the shaved portion 2a by a suitable cylinder and piston unit (not shown).

In accordance with the present invention, the machine further comprises a wear-compensating device including a pair of testing or sensing members 9, 9a (hereinafter called feelers for short) which are located immediately upstream of the jaws 7, 7a but downstream of the rolls 6 and are biased against two diametrically opposite points of the shaved portion 2a to determine its diameter on a continuous basis. The upper feeler 9a cooperates with the input member 10a of an inductive signal generator 10. This signal generator 10 is installed in an electric circuit and changes the voltage in response to displacement of the input member 10a. The voltage pulses are amplified by an amplifier 11 and the amplified signals are transmitted to a comparator 12 which compares the strength of signals with a predetermined signal and causes a prime mover 46 (preferably an electric motor) to adjust the tools 30 when the detected diameter of the workpiece portion 2a deviates from the desired diameter.

The amplifier 11 is further connected with a gauge 13 whose dial is calibrated to indicate deviations of the actual diameter of the workpiece portion 2a from the desired diameter. The gauge 13 can be constituted by an adjustable voltmeter.

Figure 4:
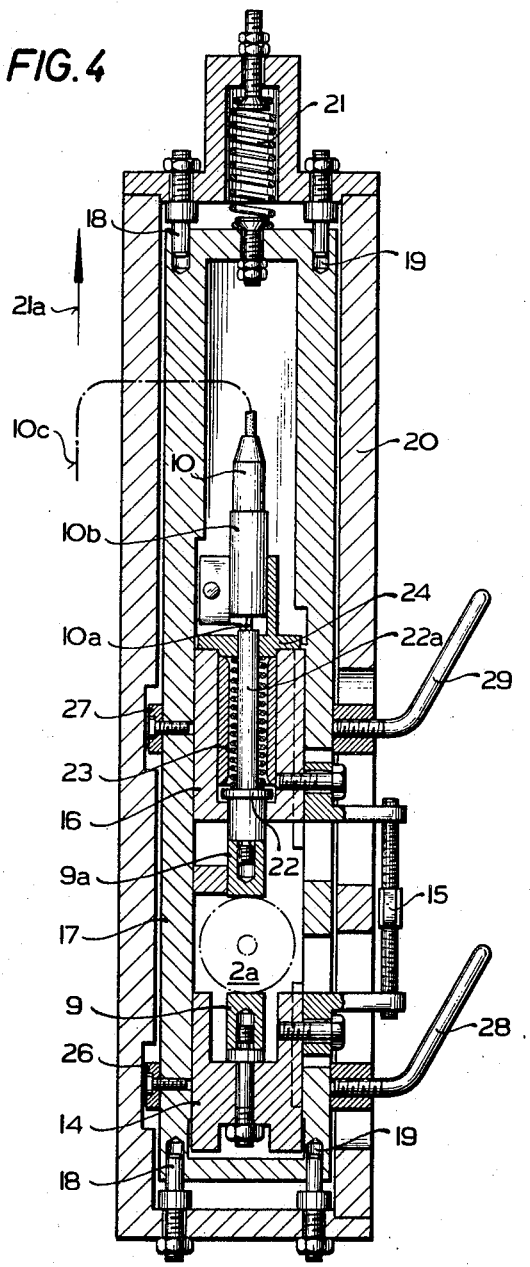
FIG. 4 is an axial sectional view of the measuring or detecting station where the diameter of the shaved portion of the workpiece is measured to determine the extent of wear on the tools.

Referring now to FIG. 4, the lower feeler 9 is mounted on a carrier 14 which is adjustably coupled to a carrier 16 for the upper feeler 9a by means of a threaded spindle 15 or the like. The latter is provided with right-hand and left-hand threads so that it moves the carriers 14, 16 nearer to or further away from each other, depending on the direction of its rotation. The carriers 14, 16 are installed in an upright inner support or frame 17 which is reciprocable in an outer support or frame 20 and is provided with bores 19 receiving portions of vertical guide pins 18 provided on the outer support or frame. A coil spring 21 forms part of biasing means for the feelers 9, 9a and tends to move the inner support 17 upwardly, as indicated in FIG. 4 by arrow 21a, in order to urge the tip of the lower feeler 9 against the shaved portion 2a. The outer support 20 is preferably affixed to the carriage 8 upstream of the jaws 7, 7a (see FIG. 2).

The upper feeler 9a is provided with a projection or stud 22a and with a flange 22 at the lower end of the stud 22a. The flange 22 engages one end of a helical spring 23 which biases the feeler 9a downwardly. The upper end of the spring 23 is engaged by a retainer 24 in the form of a cover which is secured to the carrier 16 and overlies the bore for the spring 23. The upper portion of the stud 22a is guided in a bore of the retainer 24 and abuts against the input member 10a of the signal generator 10. The housing 10b of the signal generator 10 is secured to the retainer 24. A flexible cable or conductor 10c connects the signal generator 10 with the amplifier 11 which is installed in a control box 25 (see FIG. 2). The control box 25 further accommodates the aforementioned gauge 13 and comparator 12.

The inner support 17 of FIG. 4 carries two arresting or locking devices 26, 27 which are respectively located at the levels of the carriers 14, 16. The lower arresting device 26 resembles a strap which is provided with a threaded handle 28 rotatable by hand to urge the inner support 17 against the lower carrier 14. The upper arresting device 27 also resembles a strap and has a threaded handle 29 which can be manipulated by hand to lock the inner support 17 to the upper carrier 16. Thus, the two arresting devices 26, 27 can secure the carriers 14, 16 to the inner support 17 so that the distance between the two carriers thereupon remains unchanged. Adjustments of the carriers 14, 16 with reference to each other (in and counter to the direction indicated by arrow 21a) can be carried out by rotating the adjusting spindle 15 before the carriers are locked to the inner support 17. The spindle 15 is used to effect precise adjustments of the feelers 9, 9a so that the signal generator 10 can produce signals which reflect the actual diameter of the shaved portion 2a. Due to the fact that the inner support 17 is reciprocable in the outer support 20, eventual flexing of the shaved portion 2a has no effect on the measurements of its diameter. This will be readily understood by considering that the upper feeler 9a is biased by the spring 23 so that it remains in abutment with the workpiece portion 2a even if the entire inner support 17 moves up or down in response to flexing of the shaved portion. The signal generator 10 shares movements of the carriers 14, 16 and inner support 17 because it is mounted on the retainer 24 which is rigid with the upper carrier 16. In other words, displacements of the upper feeler 9a with reference to the lower feeler 9 invariably indicate changes in diameter of the shaved portion 2a.

Figure 3:
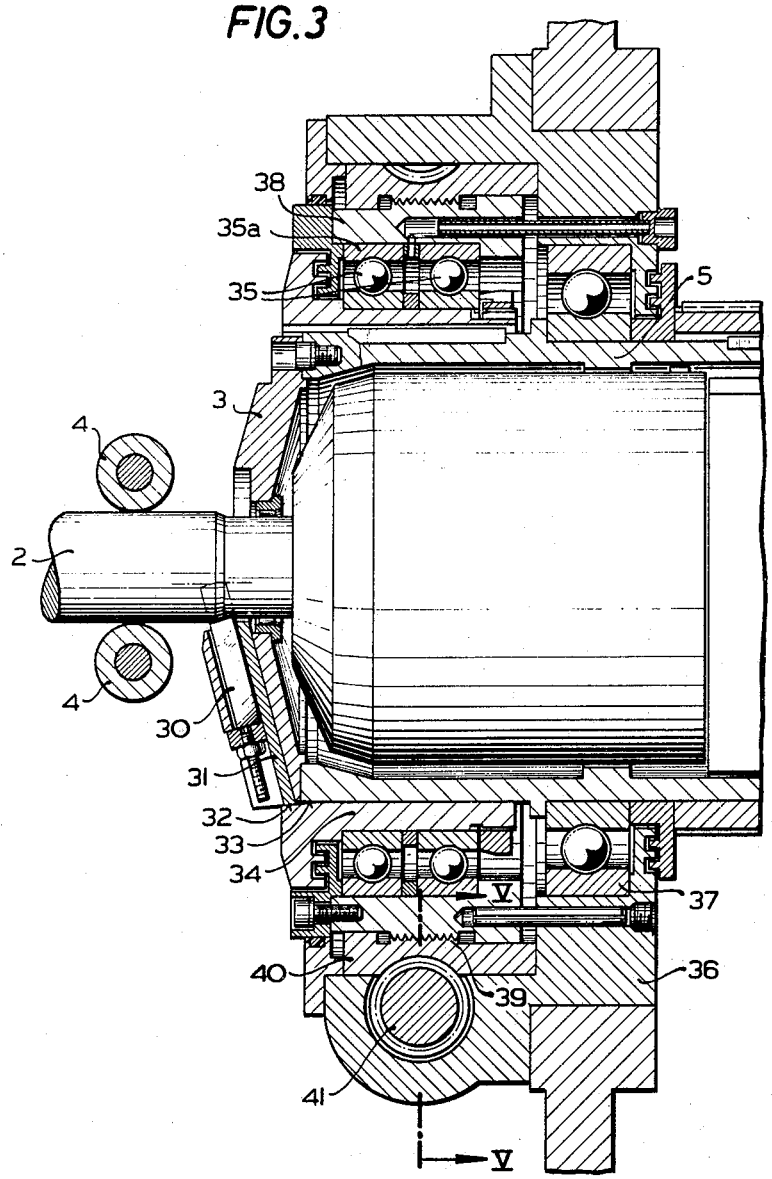
FIG. 3 is an axial sectional view of the shaving station and illustrates the structure which adjusts the tools in automatic response to wear on their cutting edges.

Referring to FIG. 3, the hollow cylinder 5 supports and rotates the shaving head 3 which in turn supports several equidistant tools 30 (only one shown). Each tool 30 is mounted in a slide 31 having at one end an inclined cam face 32. These cam faces 32 abut against a conical internal face 33 of a displacing sleeve 34 and bear against the internal face 33 by centrifugal force when the shaving head 3 rotates with the cylinder 5.

Figure 5:
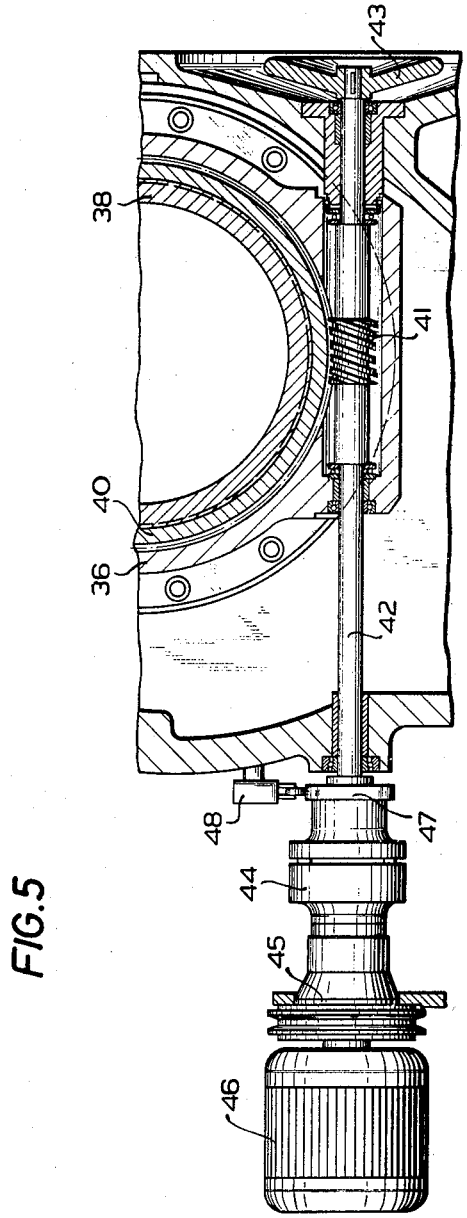
FIG. 5 is a section as seen in the direction of arrows from the line V—V of FIG. 3 and illustrates the prime mover of the wear-compensatitng means.

The displacing sleeve 34 is surrounded by two antifriction bearings 35 mounted in a frame member 36 which also carries an antifriction bearing 37 for the cylinder 5. The displacing sleeve 34 is non-rotatably but axially movably secured to the cylinder 5. The two bearings 35 are inserted with minimal axial clearance and their outer races 35a are connected with an externally threaded ring 38. The external threads 39 of the ring 38 mesh with internal threads provided in a worm wheel 40. The external threads of the worm wheel 40 mesh with the threads of a worm 41. The latter is rotatable clockwise and counterclockwise to move the ring 38 axially whereby the ring shifts the bearings 35 and the displacing sleeve 34. The shaft 42 of the worm 41 (see FIG. 5) carries an overriding hand wheel 43 at one end and its other end is connected with one element of a clutch 44 the other element of which is connected with the output member of a gear reducer 45. This gear reducer is driven by the electric motor 46. The shaft 42 is the output shaft of the motor 46 and further carries a cam 47 which constitutes a trip and can actuate a limit switch 48 to arrest the motor 46.

The operation is as follows:

By loosening the handles 28, 29, the operator releases the carriers 14, 16 so that the carriers and their feelers 9, 9a are adjustable, within limits, with reference to the inner support 17. A pattern or sample having an accurately determined diameter is placed between the feelers 9, 9a and the adjusting spindle 15 is turned until the pointer of the gauge 13 registers with that graduation on the dial which indicates the diameter of the pattern. The diameter of the pattern corresponds to the desired diameter of a finished workpiece, i.e., to the desired diameter of the shaved portion 2a. In the next step, the operator actuates the handles 28, 29 to lock the carriers 14, 16 to the inner support 17. The work-engaging tips of the feelers 9, 9a are provided with funnel-shaped portions 49 (see FIG. 2) which permit unimpeded entry of the leading end of a shaved workpiece portion 2a.

Once the machine is in operation and the tools 30 remove material from successive increments of the axially moving workpiece 2, the shaved portion 2a of the workpiece enters the space between the feelers, 9, 9a and advances between and beyond the jaws 7, 7a. The cutting edges of the tools 30 are subjected to wear whereby the diameter of the shaved portion 2a increases and the upper feeler 9a is displaced upwardly against the opposition of the spring 23 to bear against the input member 10a of the signal generator 10 which transmits a corresponding signal through the conductor 10c. When the diameter of the shaved portion 2a at the shaving station increases due to wear upon the cutting edges of tools 30, the entire inner support 17 moves downwardly because the shaved portion 2a is in continuous contact with the lower feeler 9. The gauge 13 indicates the change in diameter and the amplifier 11 sends a signal to the comparator 12 which completes the circuit of the motor 46 so that the latter rotates the output shaft 42 and the worm 41 whereby the worm rotates the worm wheel 39 with resultant axial movement of the displacing sleeve 34. The internal face 33 of the sleeve 34 shifts the slides 31 and moves the tools 30 radially inwardly until the cam 47 causes the limit switch 48 to open the circuit of the motor 46. The comparator 12 is of known construction and is provided with means for comparing signals transmitted by the amplifier 11 with a standard signal. If the difference between the signals transmitted via cable 10c and the standard signal is sufficiently large, the comparator 12 completes the circuit of the motor 46 and causes the latter to move the tools 30 radially inwardly. The comparator 12 is adjustable by means of the knob 50 shown in FIG. 2 so that it can compare the signals received from amplifier 11 with a variable standard signal. The configuration of the cam 47 may be such that the limit switch 48 opens the circuit of the motor 46 after the output shaft 42 completes one-half of a full revolution provided, of course, that the transmission between the motor 46 and the slides 31 for the tools 30 is of a type which can compensate for wear on the cutting edges of tools in response to such angular displacement of the output shaft. The operator merely watches the gauge 13 to determine whether or not the pointer registers with the desired graduation on the dial and whether the motor 46 is started automatically when the measured diameter of the shaved portion 2a deviates from the desired diameter.

An important advantage of our shaving machine is that the adjustment of tools 30 is not dependent on carefulness and skill of the operators and that the tools 30 can be used much longer than in presently known shaving machines because the motor 46 automatically compensates for wear on the cutting edges. Also, and since the measuring station (feelers 9, 9a) is closely adjacent to the shaving station (tools 30), the length of shaved workpieces whose diameter is greater than e desired diameter is very short. The machine can be readily adjusted in such a way that the tools 30 are moved toward the axis of the shaving head 3 before the diameter of the shaved portion 2a increases beyond a value which is unacceptable for a certain utilization of the shaved workpiece.

The hand wheel 43 enables the operator to override the wear-compensating device by adjusting the tools 30 independently of signals produced by the device 10.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A machine for shaving workpieces of circular cross section, comprising a feed for advancing a workpiece lengthwise; a rotary holder surrounding the workpiece; a tool carried by and adjustable toward and away from the axis of said holder, said tool having a cutting portion to remove material from the workpiece in response to rotation of said holder; and compensating means for adjusting the tool toward said axis to compensate for the wear of said cutting portion and including a feeler arrangement located downstream of said tool to determine the diameter of the shaved workpiece, said feeler arrangement including a movably mounted support biased in direction against said workpiece, a first feeler mounted on said support movable together with the same and adapted to engage the workpiece, and a second feeler movably mounted on said support opposite said first feeler and biased against said workpiece relative to said support so that said feelers contact the shaved workpiece at two points located diametrically opposite each other whereby said feelers will move toward and away from the axis of said shaved workpiece upon change of the diameter of the latter, signal generating means connected to one of said feelers for movement therewith and cooperating with the other feeler so as to produce signals indicating changes in the diameter of said shaved workpiece, and motion transmitting means for adjusting the tool in response to said signals.

2. A machine as defined in claim 1, wherein said feed comprises means for holding the workpiece against rotation and wherein said motion transmitting means comprises comparator means for comparing the signals produced by said signal generating means with a signal indicating the desired diameter of the shaved portion of the workpiece and a prime mover controlled by said comparator means to effect adjustment of said tool.

3. A machine as defined in claim 2, further comprising a transmission interposed between said prime mover and said tool.

4. A machine for shaving workpieces of circular cross-section comprising a feed for advancing a workpiece lengthwise; a rotary holder surrounding the workpiece; a tool carried by and adjustable toward and away from the axis of said holder, said tool having a cutting portion to remove material from the workpiece in response to rotation of said holder; and cmpensating means for adjusting the tool towards said axis to compensate for the wear of said cutting portion and comprising a pair of feelers located downstream of said tool to determine the diameter of said workpiece, means for biasing said feelers against the shaved portion of the workpiece at two points located diametrically opposite each other, a carrier for each feeler, a first support, locking means releasably fixing said carriers to said first support, a second support adjustably carrying said first support, signal generating means associated with said feelers and operative to produce signals indicating changes in the diameter of the workpiece, and motion transmitting means for adjusting the tool in response to such signals.

5. A machine for shaving workpieces of circular cross-section comprising a feed for advancing a workpiece lengthwise; a rotary holder surrounding the workpiece; a tool carried by and adjustable toward and away from the axis of said holder, said tool having a cutting portion to remove material from the workpiece in response to rotation of said holder; and compensating means for adjusting the tool towards the axis to compensate for the wear of said cutting portion and comprising a pair of feelers located downstream of said tool to determine the diameter of said workpiece, means for biasing said feelers against shaved portions of said workpiece at opposite points located diametrically opposite each other, a carrier for each feeler, adjusting means for moving said carriers with reference to each other, signal generating means associated with said feelers and operative to produce signals indicating changes in the diameter of the workpiece, and motion transmitting means for adjusting the tool in response to such signals.

6. A machine as defined in claim 4, wherein said biasing means comprises first spring means operating between one of said feelers and the respective carrier to urge said one feeler against the shaved portion of the workpiece and second spring means operating between said supports to bias the other feeler against the shaved portion of the workpiece through the intermediary of said locking means and the carrier for said other feeler.

7. A machine as defined in claim 5, wherein said adjusting means comprises a spindle having a set of left-hand threads meshing with one of said carriers and a set of right-hand threads meshing with the other carrier.

8. A machine as defined in claim 1, further comprising means for indicating the intensity of signals produced by said signal generating means.

9. A machine for shaving workpieces of circular cross-section comprising a feed for advancing a workpiece lengthwise; a rotary holder surrounding the workpiece; a tool carried by and adjustable toward and away from the axis of said holder, said tool having a cutting portion to remove material from the workpiece in response to rotation of said holder; and compensating means for adjusting the tool toward said axis to compensate for the wear on said cutting portion and comprising sensing means located downstream of said tool to determine the diameter of the workpiece, signal generating means associated with said sensing means and operative to produce signals indicating changes in the diameter of the workpiece, and motion transmitting means for adjusting the tool in response to such signals, said motion transmitting means comprising an electric motor, means for completing the circuit of said motor in response to signals from said signal generating means, transmission means connecting said motor with said tool, and means for automatically arresting said motor in response to a predetermined adjustment of said tool and including a limit switch in circuit with said motor and a rotary trip driven by said motor and arranged to open said switch in response to a predetermined angular displacement.

References Cited

UNITED STATES PATENTS 3,128,658   4/1964   Mitchell et al. _____ 82—20

FOREIGN PATENTS 1,188,413   11/1958   Germany.
316,871   12/1956   Switzerland.

LEONIDAS VLACHOS, Primary Examiner

U.S. Cl. X.R.

82—34